(12) United States Patent
Hagihara

(10) Patent No.: US 7,612,320 B2
(45) Date of Patent: Nov. 3, 2009

(54) SOLID-STATE IMAGING APPARATUS WITH RESET OPERATION

(75) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/035,001

(22) Filed: Feb. 21, 2008

(65) Prior Publication Data

US 2008/0197269 A1    Aug. 21, 2008

(30) Foreign Application Priority Data

Feb. 21, 2007    (JP) .............................. 2007-040453

(51) Int. Cl.
*H01L 27/00*    (2006.01)
(52) U.S. Cl. ................................. 250/208.1; 250/214 R
(58) Field of Classification Search .............. 250/208.1, 250/214 R; 257/290–294, 440–443; 348/301–312
See application file for complete search history.

(56) References Cited

U.S. PATENT DOCUMENTS 4,819,071 A * 4/1989 Nakamura ................... 348/245

FOREIGN PATENT DOCUMENTS

JP    2005065184 A    3/2005

* cited by examiner

*Primary Examiner*—Que T Le
(74) *Attorney, Agent, or Firm*—Westerman, Hattori, Daniels & Adrian, LLP

(57) ABSTRACT

A solid-state imaging apparatus including a reset means for resetting an electric charge accumulation means, an amplification means for amplifying a signal corresponding to signal charges accumulated at the electric charge accumulation means, and a selection means for activating an outputting to a signal output line of the signal amplified by the amplification means; and a control section for, when resetting the electric charge accumulation means, effecting control so as to bring a potential of a control terminal of a signal transfer means to a negative potential at least immediately before a reset operation by the reset means and to bring the potential of the control terminal of the signal transfer means to a potential higher than the negative potential after the reset operation.

8 Claims, 16 Drawing Sheets

SOLID-STATE IMAGING APPARATUS WITH RESET OPERATION

This application claims benefit of Japanese Patent Application No. 2007-040453 filed in Japan on Feb. 21, 2007, the contents of which are incorporated by this reference.

BACKGROUND OF THE INVENTION

The present invention relates to solid-state imaging apparatus that are widely used for example as image input apparatus.

Various types such as those of MOS or CCD have been proposed and are practically employed as solid-state imaging apparatus which are used for example as image input apparatus. Among the MOS solid-state imaging apparatus are the so-called amplification type solid-state imaging apparatus having pixels of amplified solid-state imaging device (APS: Active Pixel Sensor) where a drive transistor for amplification is provided at a pixel signal generation means for generating pixel signal corresponding to signal charge generated at an electric charge generation means. Many of CMOS solid-state imaging apparatus have such construction. In these amplification type solid-state imaging apparatus, reading of pixel signal to the outside is achieved by optionally selecting signals from each individual unit pixel with controlling addresses for a pixel section where a plurality of unit pixels are arranged into a matrix.

Further, the construction disclosed for example in Japanese Patent Application Laid-Open 2005-65184 is generally employed as electric charge generation means (such as photodiode PD section) in pixel of CMOS solid-state imaging apparatus which are now used in video camera, digital still camera, etc. In particular, a complete transfer type buried photodiode is used as the electric charge generation means so that signal charge generated at the photodiode PD section can be completely transferred to an electric charge accumulation section (floating diffusion FD section) to reduce noise.

SUMMARY OF THE INVENTION

In a first aspect of the invention, there is provided a solid-state imaging apparatus including: an image section with units arranged into a matrix each having an electric charge generation means for generating signal charges corresponding to the amount of an incident electromagnetic wave, an electric charge accumulation means for accumulating signal charges generated at the electric charge generation means, a signal transfer means for transferring signal charges generated at the electric charge generation means to the electric charge accumulation means, a reset means for resetting the electric charge accumulation means, an amplification means for amplifying a signal corresponding to signal charges accumulated at the electric charge accumulation means, and a selection means for activating an outputting to a signal output line of the signal amplified by the amplification means; and a control section for, when resetting the electric charge accumulation means, effecting control so as to bring a potential of a control terminal of the transfer means to a negative potential at least immediately before a reset operation by the reset means and to bring the potential of the control terminal of the transfer means to a potential higher than the negative potential after the reset operation.

In a second aspect of the invention, the control section in the solid-state imaging apparatus according to the first aspect effects control so that a reset potential of the electric charge accumulation means is outputted to the signal output line after bringing the potential of the control terminal of the transfer means to a potential higher than negative potential.

In a third aspect of the invention, a subunit consisting of the electric charge generation means and the signal transfer means is formed in the solid-state imaging apparatus according to the first or second aspect, and a plurality of the subunit are connected in common to the electric charge accumulation means.

In a fourth aspect of the invention, the control section in the solid-state imaging apparatus according to any one of the first to third aspects sets a potential higher than the negative potential as ground potential.

DESCRIPTION OF THE PREFERRED EMBODIMENTS

Some embodiments of the solid-state imaging apparatus according to the invention will be described below with reference to the drawings.

Embodiment 1

A first embodiment of the solid-state imaging apparatus according to the invention will now be described.

Figure 1:
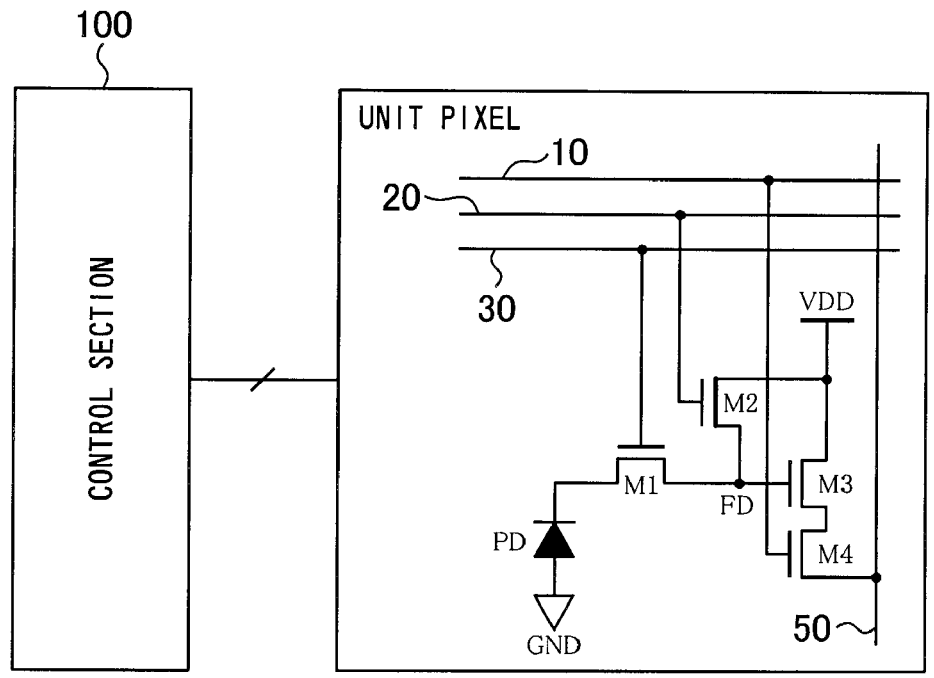
FIG. 1 schematically shows construction of a first embodiment of the solid-state imaging apparatus according to the invention.

The first embodiment is an embodiment corresponding to the first, second, and fourth aspects of the invention. FIG. 1 schematically shows construction of the solid-state imaging apparatus according to the first embodiment, showing an equivalent circuit indicating construction of unit pixel of pixel section, signal line for each unit pixel, and a control section indicated in block. It should be noted that, while only a single unit pixel is shown in FIG. 1, the pixel section is formed by arranging a plurality of unit pixels into a matrix. The construction of unit pixel will now be described. A unit pixel includes: a photodiode PD for generating signal charges corresponding to the amount of an incident electromagnetic wave; a charge accumulation section FD for accumulating electric charges generated at the photodiode PD; a transfer transistor M1 serving as a transfer switch for transferring electric charges generated at the photodiode PD to the charge accumulation section FD; a reset transistor M2 serving as a reset switch for resetting the charge accumulation section FD; an amplification transistor M3 for amplifying a signal corresponding to electric charges of the charge accumulation section FD; and a select transistor M4 serving as a select switch for selecting the signal. The solid-state imaging apparatus is then formed with including: a select switch line 10 connected to a gate of the select transistor M4; FD reset switch line 20 connected to a gate of the reset transistor M2; a transfer switch line 30 connected to a gate of the transfer transistor M1; a vertical signal line 50 connected to a source of the select transistor M4; and a control section 100 for driving/controlling these. The reset transistor M2 in this illustrated example is assumed to be a depletion type transistor or its equivalent.

Figure 2:
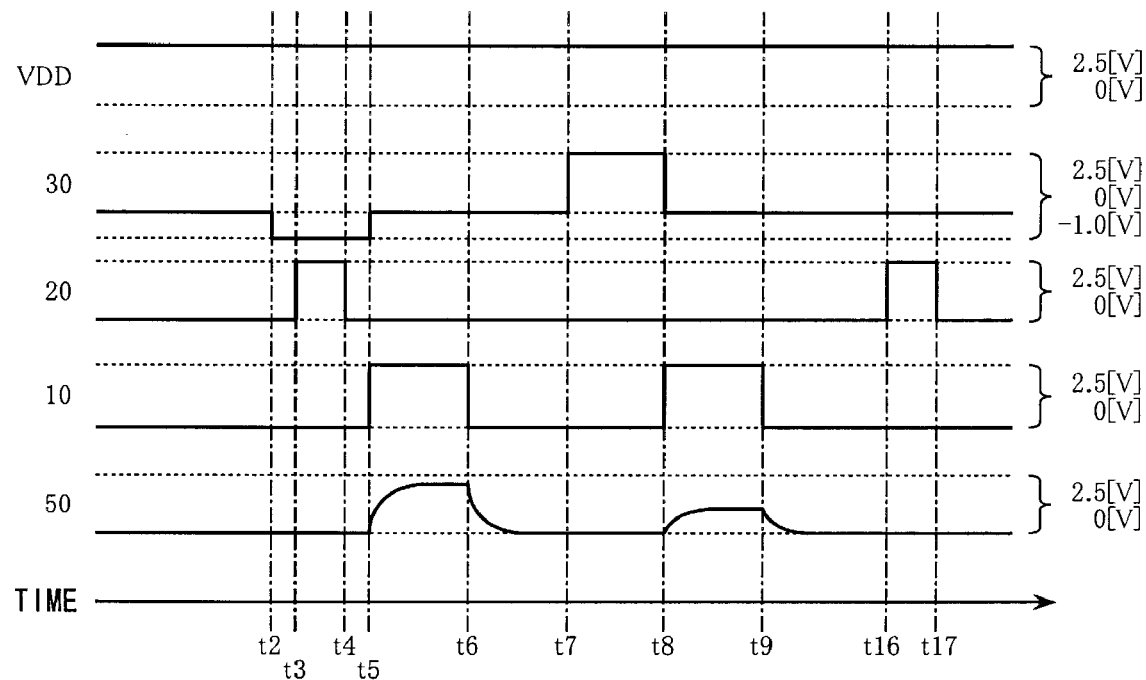
FIG. 2 is a timing chart for explaining an operation of the first embodiment shown in FIG. 1.

An operation of the first embodiment having the above construction will now be described by way of the timing chart shown in FIG. 2. At first, the transfer switch line 30 is brought to Minus level (time t2~t5), and the FD reset switch line 20 is then driven to High level (time t3~t4) to reset the charge accumulation section FD to a power supply voltage VDD. Next, after the resetting of the charge accumulation section FD, the transfer switch line 30 is brought to ground voltage GND (time t5~t7), and at the same time the select switch line 10 is driven to High level (time t5~t6) to output a reset level of pixel to the vertical signal line 50.

Next, the transfer switch line 30 is driven to High level (time t7~t8) so that signal charges from photodiode PD are transferred to the charge accumulation section FD. The select switch line 10 is then driven to High level again (time t8~t9) to output signal level of unit pixel to the vertical signal line 50. Subsequently, a difference between the reset level and the signal level of unit pixel inputted through the vertical signal line 50 is taken at a signal processing circuit section (not shown) to thereby obtain a signal component. Here, High level is assumed to be the power supply voltage VDD (2.5 V in this case), and Minus level be a negative voltage (−1.0 V in this case) below the ground voltage GND (0V).

Figure 3:
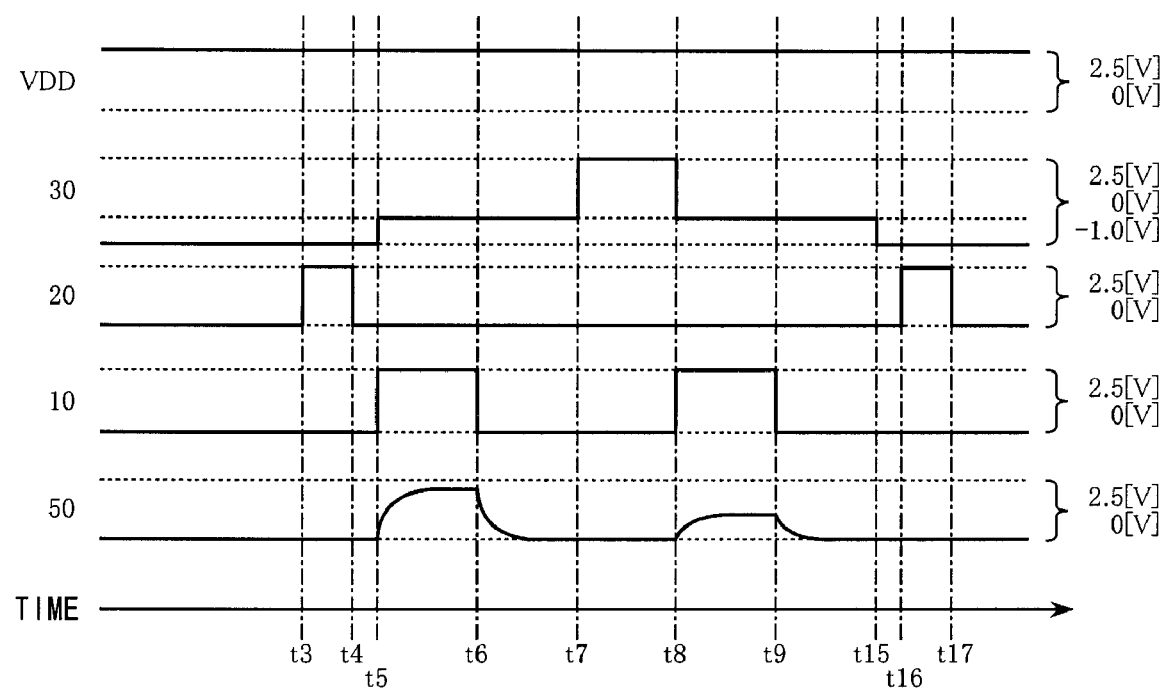
FIG. 3 is a timing chart for explaining another operation of the first embodiment shown in FIG. 1.

A more preferred drive operation of the first embodiment will now be described by way of the timing chart shown in FIG. 3. Referring to FIG. 3, the transfer switch line 30 is brought to Minus level in the periods except one from time t5 to t15, and the rest of the operation is similar to the drive operation shown in the timing chart of FIG. 2. It is possible with this drive operation to suppress a dark current occurring at the unit pixel (especially at photodiode PD).

Figure 4:
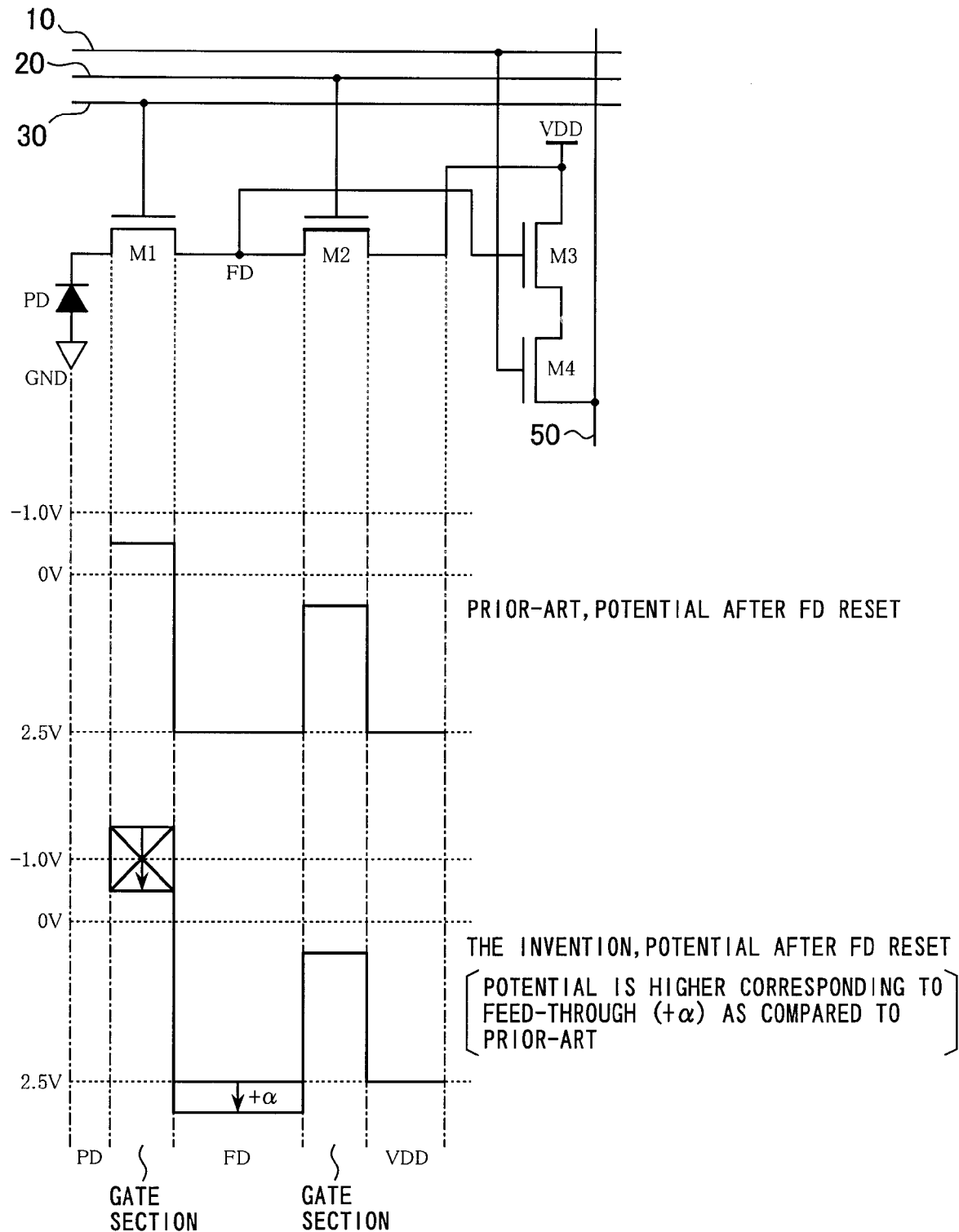
FIG. 4 shows potential of unit pixel at the time of FD reset operation in the first embodiment shown in FIG. 1 as compared to a prior-art example.

FIG. 4 shows the potential conditions of each section at the time of FD reset operation of the transfer transistor M1, FD reset transistor M2, and the charge accumulation section FD in unit pixel of the present embodiment in comparison with those of a prior-art example. The reset potential of the charge accumulation section FD is brought so as to attain a higher potential (+α) as compared to the prior-art technique by bringing the transfer switch line 30 to Minus level at the time of resetting the charge accumulation section FD and bringing the transfer switch line 30 to the ground voltage GND after the reset of the charge accumulation section FD. In other words, the reset potential of the charge accumulation section FD is made more preferable by using a feed-through effect of the transfer transistor M1.

As described above, the transfer switch line 30 is brought from Minus level to ground voltage GND after the reset of the charge accumulation section FD so that a feed-through effect of the transfer transistor M1 is used to make the reset potential of the charge accumulation section FD more preferable as compared to the case where the level change operation of transfer switch line is absent. A low voltage drive or a wide dynamic range drive in the case where the power supply voltage is unchanged thereby becomes possible.

Embodiment 2

Figure 5:
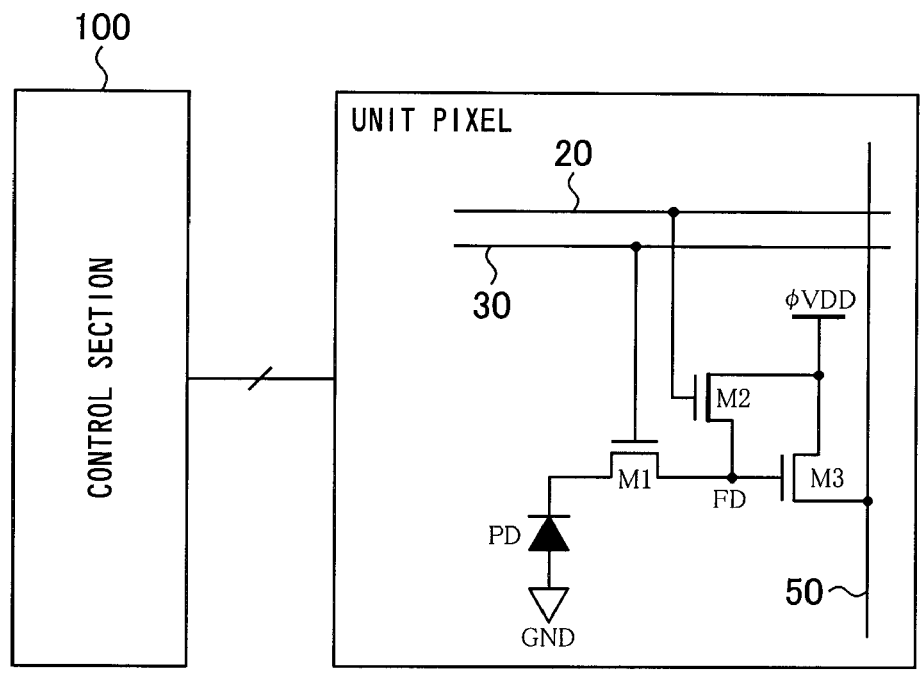
FIG. 5 schematically shows construction of the solid-state imaging apparatus according to a second embodiment.

A second embodiment will now be described. The second embodiment is an embodiment corresponding to the first, second, and fourth aspects of the invention. FIG. 5 schematically shows construction of the solid-state imaging apparatus according to the second embodiment. At first, the construction of unit pixel of the present embodiment will be described. The unit pixel of this embodiment includes: a photodiode PD for generating signal charges corresponding to the amount of an incident electromagnetic wave; a charge accumulation section FD for accumulating electric charges generated at the photodiode PD; a transfer transistor M1 serving as transfer switch for transferring electric charges generated at the photodiode PD to the charge accumulation section FD; a reset transistor M2 serving as a reset switch for resetting the charge accumulation section FD; and an amplification transistor M3 for amplifying a signal corresponding to electric charges of the charge accumulation section FD. It further includes: FD reset switch line 20 connected to a gate of the reset transistor M2; a transfer switch line 30 connected to a gate of the transfer transistor M1; a vertical signal line 50 connected to a source of the amplification transistor M3; and a control section 100 for controlling these. The reset transistor M2 in this illustrated example is assumed to be a depletion type transistor or its equivalent.

Figure 6:
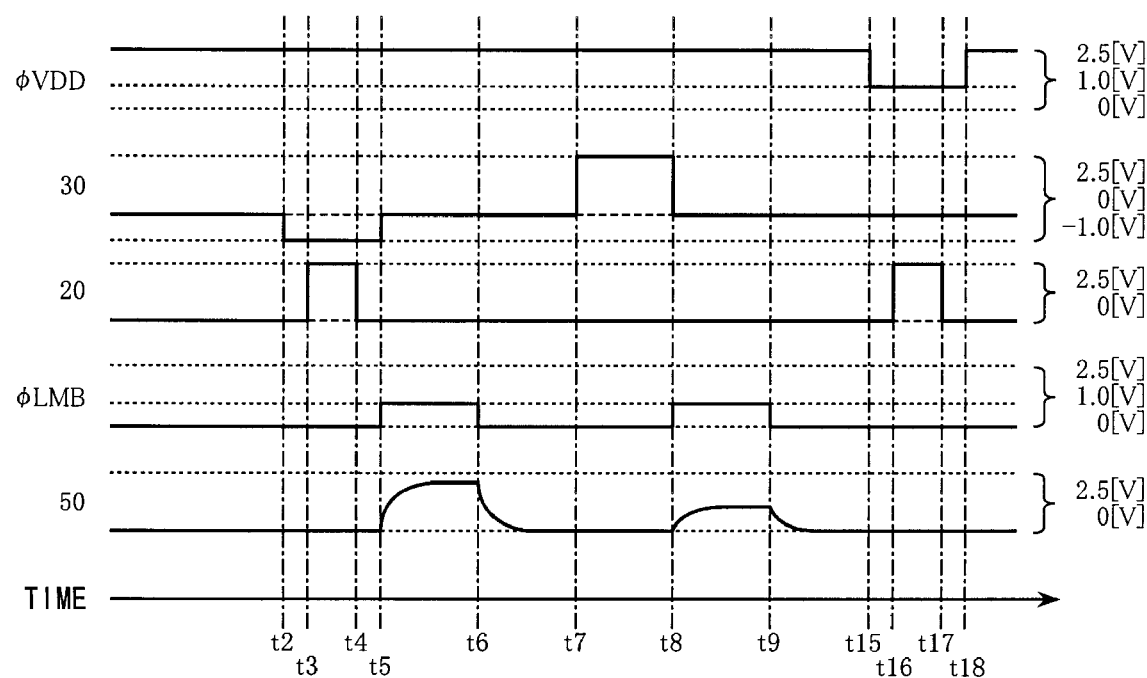
FIG. 6 is a timing chart for explaining an operation of the second embodiment shown in FIG. 5.

The solid-state imaging apparatus according to the second embodiment is different from the first embodiment shown in FIG. 1 in that an applied voltage to the power supply line VDD is effected in a manner of clock operation as φVDD instead of providing the select transistor M4 serving as a select switch so that a control by this clock operation is used as a select means. An operation of the second embodiment having the above construction will now be described by way of the timing chart shown in FIG. 6. An operation from time t2 to t9 is similar to the first embodiment. It is different from the operation shown in the timing chart of the first embodiment of FIG. 2 in that the voltage φVDD of the power supply line is brought to Low level (1.0V for example) between time t15 and t18, and FD reset switch line 20 is driven to High level (time t16~t17). The charge accumulation section FD thereby becomes Low level to put the unit pixel into unselected condition. It should be noted that, while LMB in FIG. 6 is not directly related to the invention and thus is not shown in FIG. 5, it is a clock for controlling a constant current supply connected to the vertical signal line 50. The constant current supply then is assumed to be activated when φ LMB is Low level (1.0V for example) and be inactivated when φ LMB is at the ground voltage GND level. The rest of the operation is similar to the first embodiment shown in FIG. 2.

Figure 7:
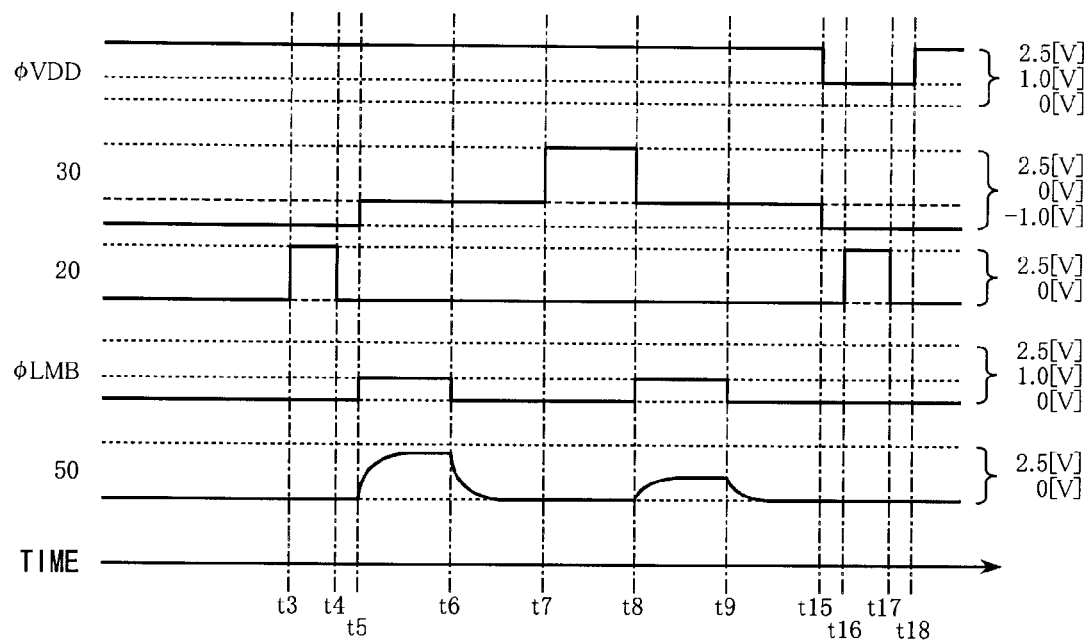
FIG. 7 is a timing chart for explaining another operation of the second embodiment shown in FIG. 5.

A more preferred drive operation of the second embodiment will now be described by way of the timing chart shown in FIG. 7. Referring to FIG. 7, the operation from time t3 to t9 is similar to the operation of the first embodiment shown in FIG. 3. It is different from the operation shown in FIG. 3 in that the voltage φ VDD of the power supply line is brought to Low level (1.0V for example) between time t15 and t18, and FD reset switch line 20 to High level (time t16~t17). The charge accumulation section FD thereby becomes Low level to put the unit pixel into unselected condition. Similarly to FIG. 6, while φ LMB in FIG. 7 is not directly related to the invention and is not shown in FIG. 5, it is a clock for controlling a constant current supply connected to the vertical signal line 50. The constant current supply then is assumed to be activated when φ LMB is Low level (1.0V for example) and be inactivated when φ LMB is at the ground voltage GND level. The rest of the operation is similar to the operation of the first embodiment shown in FIG. 3, and advantage of suppressing the dark current occurring at the unit pixel is also similar.

In the second embodiment as described above, since select transistor M4 and select switch line 10 for constituting unit pixel can be reduced in addition to the advantage similar to the first embodiment, it is possible to narrow a pixel pitch.

Embodiment 3

Figure 8:
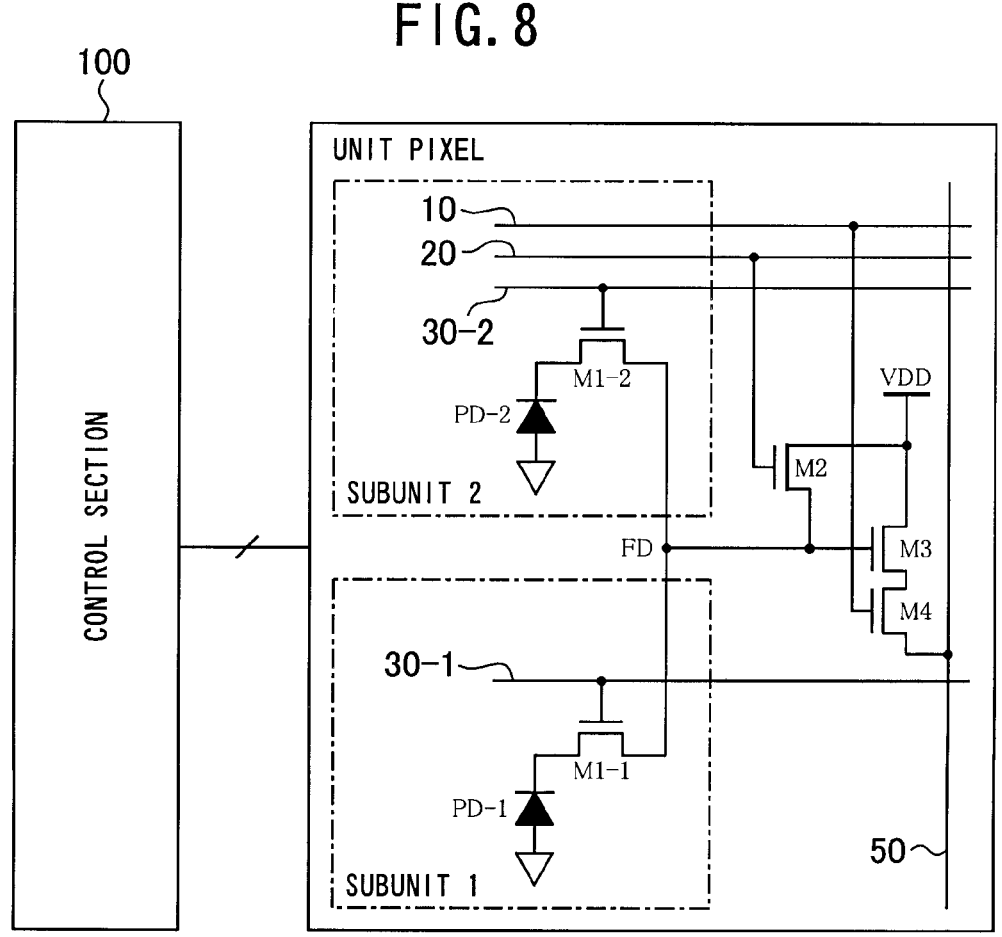
FIG. 8 schematically shows construction of the solid-state imaging apparatus according to a third embodiment.

A third embodiment will now be described. The third embodiment is an embodiment corresponding to the first to fourth aspects of the invention. FIG. 8 schematically shows construction of the solid-state imaging apparatus according to the third embodiment. At first, the construction of unit pixel of the present embodiment will be described. A unit pixel in the third embodiment includes: a subunit 1 consisting of photodiode PD-1 for generating signal charges corresponding to the amount of an incident electromagnetic wave and a transfer transistor M1-1 serving as a transfer switch for transferring electric charges generated at the photodiode PD-1 to an electric charge accumulation section FD; a subunit 2 consisting of a photodiode PD-2 for generating signal charges corresponding to incident electromagnetic wave and a transfer transistor M1-2 serving as a transfer switch for transferring electric charges generated at the photodiode PD-2 to the charge accumulation section FD; a common electric charge accumulation section FD for accumulating electric charges generated at the photodiodes PD-1 and PD-2 of the subunits 1 and 2; a reset transistor M2 serving as a reset switch for resetting the charge accumulation section FD; an amplification transistor M3 for amplifying a signal corresponding to electric charges of the charge accumulation section FD; and a select transistor M4 serving as a select switch for selecting the signal. The solid-state imaging apparatus is then formed with including: a select switch line 10 connected to a gate of the select transistor M4; FD reset switch line 20 connected to a gate of the reset transistor M2; a transfer switch line 30-1 connected to a gate of the transfer transistor M1-1 of subunit 1; a transfer switch line 30-2 connected to a gate of the transfer transistor M1-2 of subunit 2; a vertical signal line 50 connected to a source of the select transistor M4; and a control section 100 for driving/controlling these. The reset transistor M2 in this illustrated example is assumed to be a depletion type transistor or its equivalent.

Figure 9:
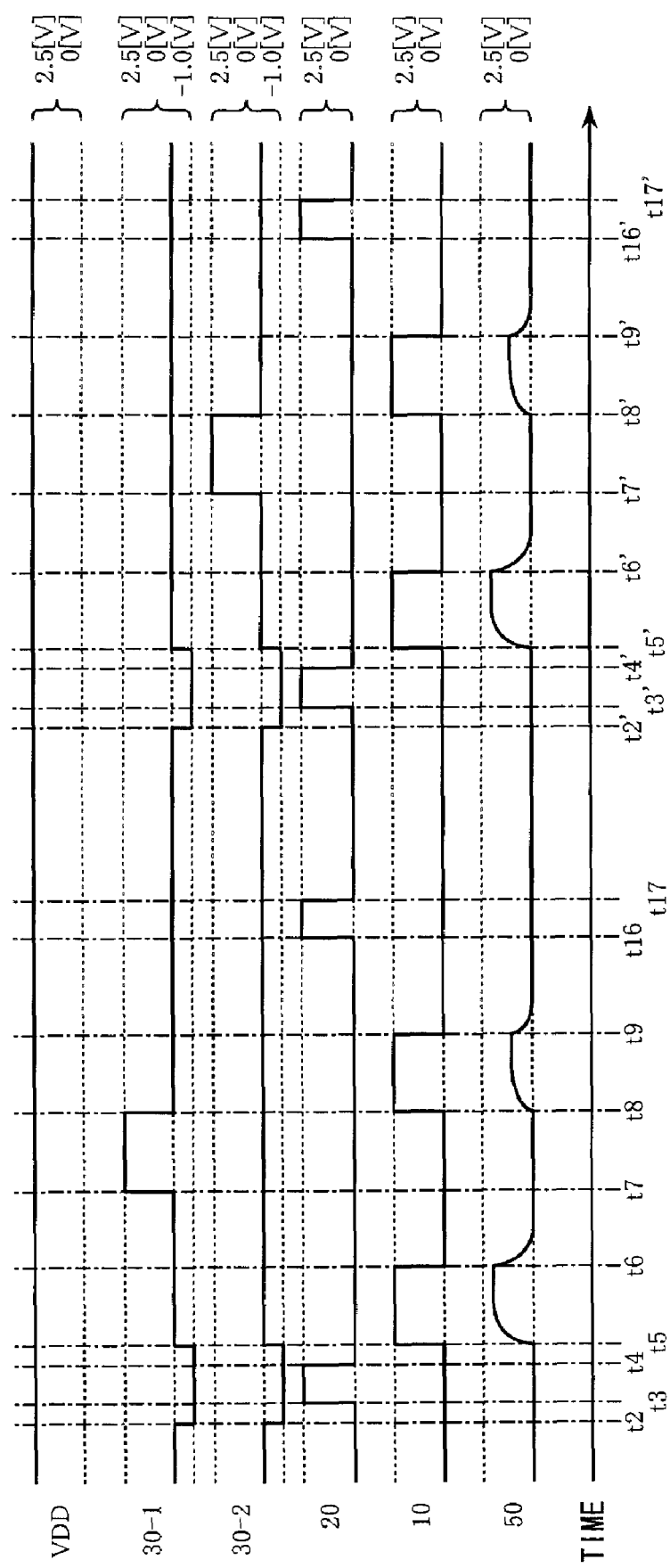
FIG. 9 is a timing chart for explaining an operation of the third embodiment shown in FIG. 8.

An operation of the third embodiment having the above construction will now be described by way of the timing chart shown in FIG. 9. At first, the transfer switch lines 30-1, 30-2 of the subunits 1 and 2 are brought to Minus level (time t2~t5), and FD reset switch line 20 is then driven to High level (time t3~t4) to reset the charge accumulation section FD to a power supply voltage VDD. Next, after the resetting of the charge accumulation section FD, the transfer switch lines 30-1, 30-2 of the subunits 1 and 2 are brought to ground voltage GND (time t5~t7), and at the same time the select switch line 10 is driven to High level (time t5~t6) to output a reset level of subunit 1 to the vertical signal line 50.

Next, the transfer switch line 30-1 of the subunit 1 is driven to High level (time t7~t8) so that signal charges of the photodiode PD-1 of the subunit 1 are transferred to the charge accumulation section FD. The select switch line 10 is then driven to High level again (time t8~t9) to output a signal level of the subunit 1 to the vertical signal line 50. Subsequently, a difference between the reset level and the signal level of the subunit 1 inputted through the vertical signal line 50 is taken at a signal processing circuit section (not shown) to thereby obtain a signal component of the subunit 1. Here, High level is assumed to be the power supply voltage VDD (2.5 V in this case), and Minus level be a negative voltage (−1.0 V in this case) below the ground voltage GND (0V).

The signal component of the subunit 2 is also similarly read out. In particular, the transfer switch lines 30-1, 30-2 of the subunits 1 and 2 are at first brought to Minus level (time 2'~t5'), and FD reset switch line 20 is then driven to High level (time t3'~t4') to reset the charge accumulation section FD to the power supply voltage VDD. Next, after the resetting of the charge accumulation section FD, the transfer switch lines 30-1, 30-2 of the subunits 1 and 2 are brought to the ground voltage GND (time t5'~t7'), and at the same time the select switch line 10 is driven to High level (time t5'~t6') to output a reset level of the subunit 2 to the vertical signal line 50.

Next, the transfer switch line 30-2 of the subunit 2 is driven to High level (time t7'~t8') to transfer signal charges of the photodiode PD-2 of the subunit 2 to the charge accumulation section FD. Next, the select switch line 10 is driven to High level again (time t8'~t9') to output a signal level of the subunit 2 to the vertical signal line 50. Subsequently, a difference between the reset level and the signal level of the subunit 2 inputted through the vertical signal line 50 is similarly taken at a signal processing circuit section (not shown) to thereby obtain a signal component of the subunit 2.

Figure 10:
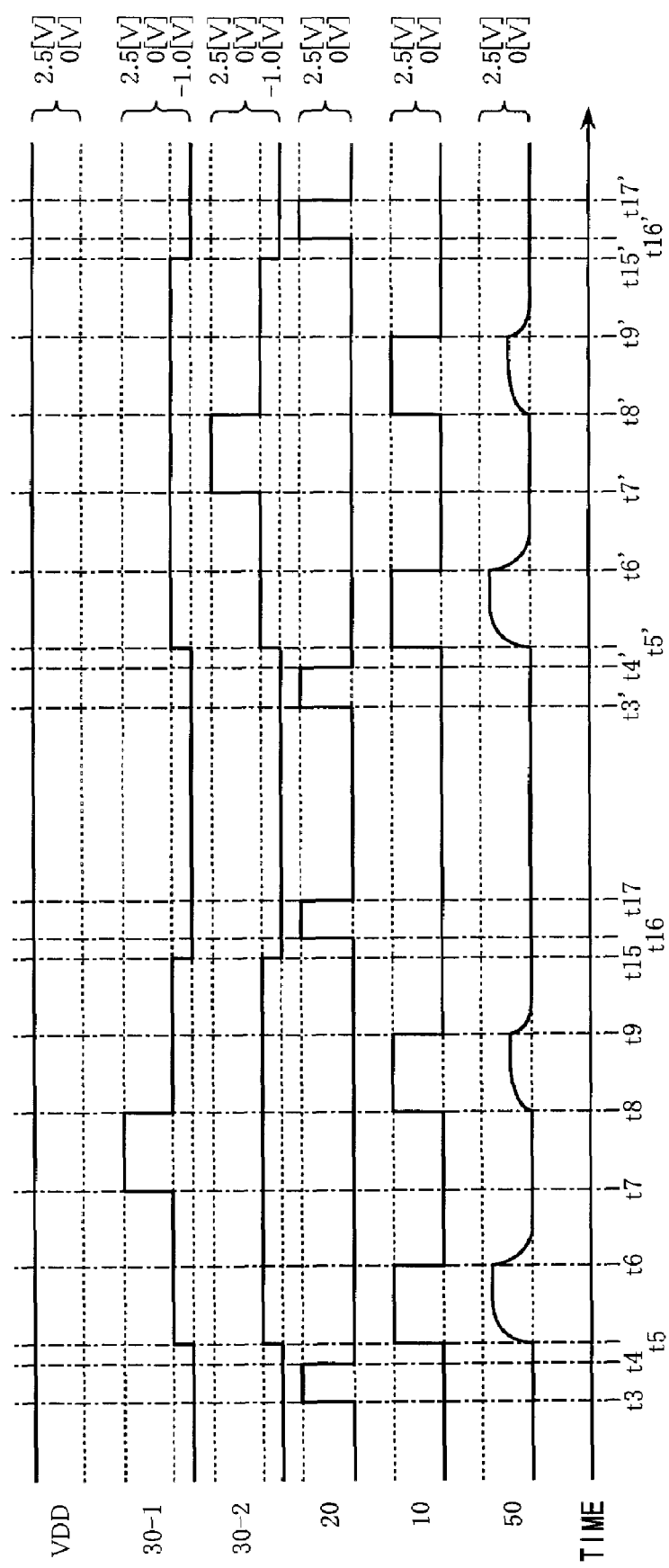
FIG. 10 is a timing chart for explaining another operation of the third embodiment shown in FIG. 8.

A more preferred drive operation of the third embodiment will now be described by way of the timing chart shown in FIG. 10. It is different from the operation shown in the timing chart of FIG. 9 in that the transfer switch lines 30-1 and 30-2 are brought to Minus level in the periods up to time t5 and after time t15 (or up to time t5' and after time t15'). It is thereby possible to suppress a dark current occurring at unit pixel (especially at photodiode PD).

As described above, the transfer switch lines 30-1 and 30-2 of the subunits 1 and 2 are brought from Minus level to ground voltage GND after the reset of the charge accumulation section FD so that a feed-through effect of the transfer transistors M1-1 and M1-2 can be used to make the reset potential of the charge accumulation section FD more preferable as compared to the case where the level change operation of transfer switch line is absent. A low voltage drive or a wide dynamic range drive in the case where the power supply voltage is unchanged thereby becomes possible. It should be noted that, while the case of a unit pixel (unit) using two subunits has been described in the present embodiment, the number of subunits is not limited to this, and there is an advantage that feed-through effect corresponding to the number of subunits (two times for two units) can be used.

Embodiment 4

Figure 11:
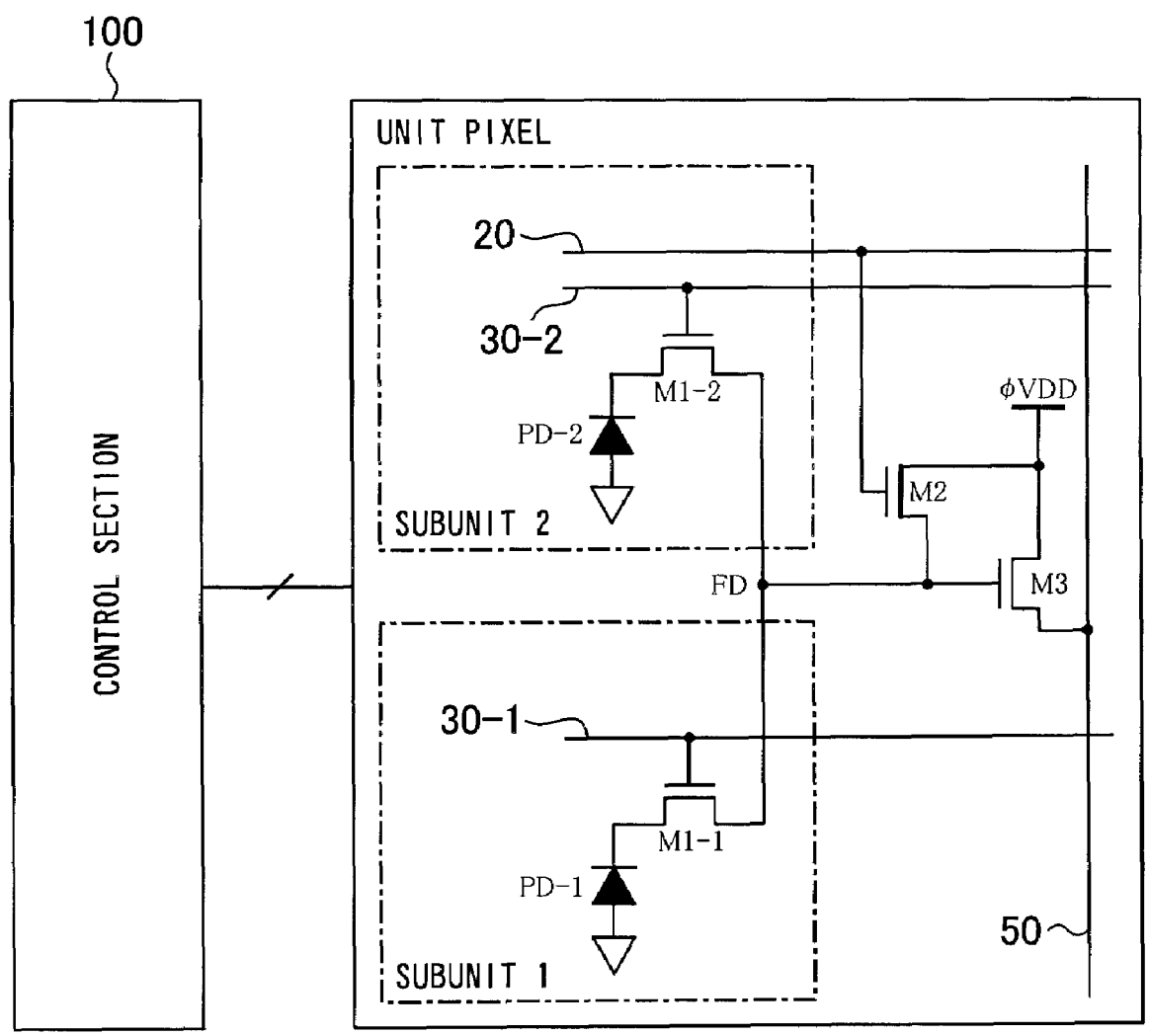
FIG. 11 schematically shows construction of the solid-state imaging apparatus according to a fourth embodiment.

A fourth embodiment will now be described. The fourth embodiment is an embodiment corresponding to the first to fourth aspects of the invention. FIG. 11 schematically shows construction of the solid-state imaging apparatus according to the fourth embodiment. At first, the construction of unit pixel of the present embodiment will be described. The unit pixel of this embodiment includes: a subunit 1 consisting of a photodiode PD-1 for generating signal charges corresponding to the amount of an incident electromagnetic wave and a transfer transistor M1-1 serving as a transfer switch for transferring electric charges generated at the photodiode PD-1 to an electric charge accumulation section FD; a subunit 2 consisting of a photodiode PD-2 for generating signal charges corresponding to an incident electromagnetic wave and a transfer transistor M1-2 serving as a transfer switch for transferring electric charges generated at the photodiode PD-2 to the charge accumulation section FD; a common electric charge accumulation section FD for accumulating electric charges generated at the photodiodes PD-1 and PD-2 of the subunits 1 and 2; a reset transistor M2 serving as a reset switch for resetting the charge accumulation section FD; and an amplification transistor M3 for amplifying a signal corresponding to electric charges of the charge accumulation section FD. The solid-state imaging apparatus is then formed with including: FD reset switch line 20 connected to a gate of the reset transistor M2; a transfer switch line 30-1 connected to a gate of the transfer transistor M1-1 of the subunit 1; a transfer switch line 30-2 connected to a gate of the transfer transistor M1-2 of the subunit 2; a vertical signal line 50 connected to a source of the amplification transistor M3; and a control section 100 for driving/controlling these. The reset transistor M2 in this illustrated example is assumed to be a depletion type transistor or its equivalent.

Figure 12:
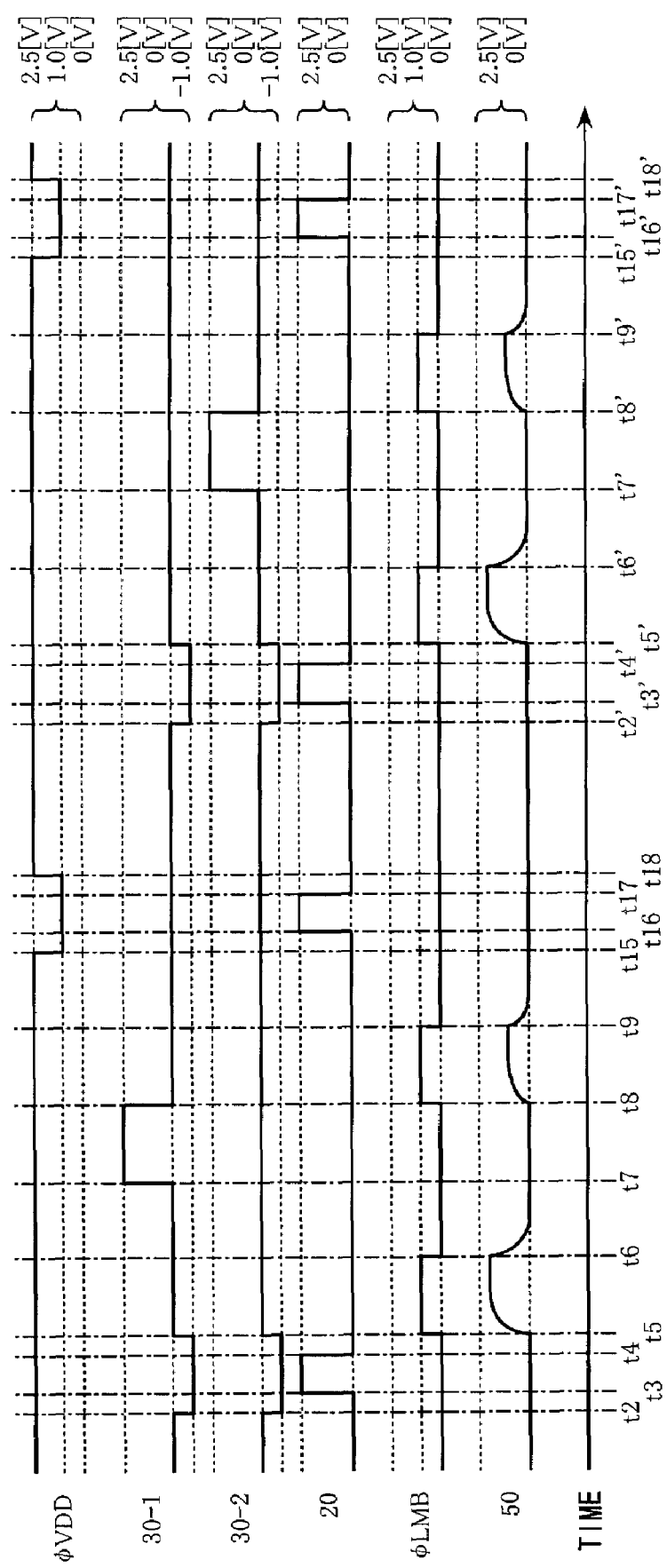
FIG. 12 is a timing chart for explaining an operation of the fourth embodiment shown in FIG. 11.

The fourth embodiment is different from the third embodiment shown in FIG. 8 in that an applied voltage to the power supply line VDD is effected in a manner of clock operation as φVDD instead of providing the select transistor M4 serving as a select switch so that a control by this clock operation is used as a select means. An operation of the fourth embodiment having the above construction will now be described by way of the timing chart shown in FIG. 12. It is similar to the third embodiment shown in FIG. 9 from time t2 to t9. It is different from the operation shown in the timing chart of the third embodiment of FIG. 9 in that the voltage φVDD of the power supply line is brought to Low level (1.0V for example) between time t15 and t18, and FD reset switch line 20 is driven to High level (time t16~t17). The charge accumulation section FD thereby becomes Low level to put unit pixel into unselected condition. It should be noted that, while φLMB in FIG. 12 is not directly related to the invention and thus is not shown in FIG. 11, it is a clock for controlling a constant current supply connected to the vertical signal line 50. The constant current supply then is assumed to be activated when φLMB is Low level (1.0V for example) and be inactivated when φLMB is at the ground voltage GND level. The rest of the operation is similar to the third embodiment shown in FIG. 9.

Figure 13:
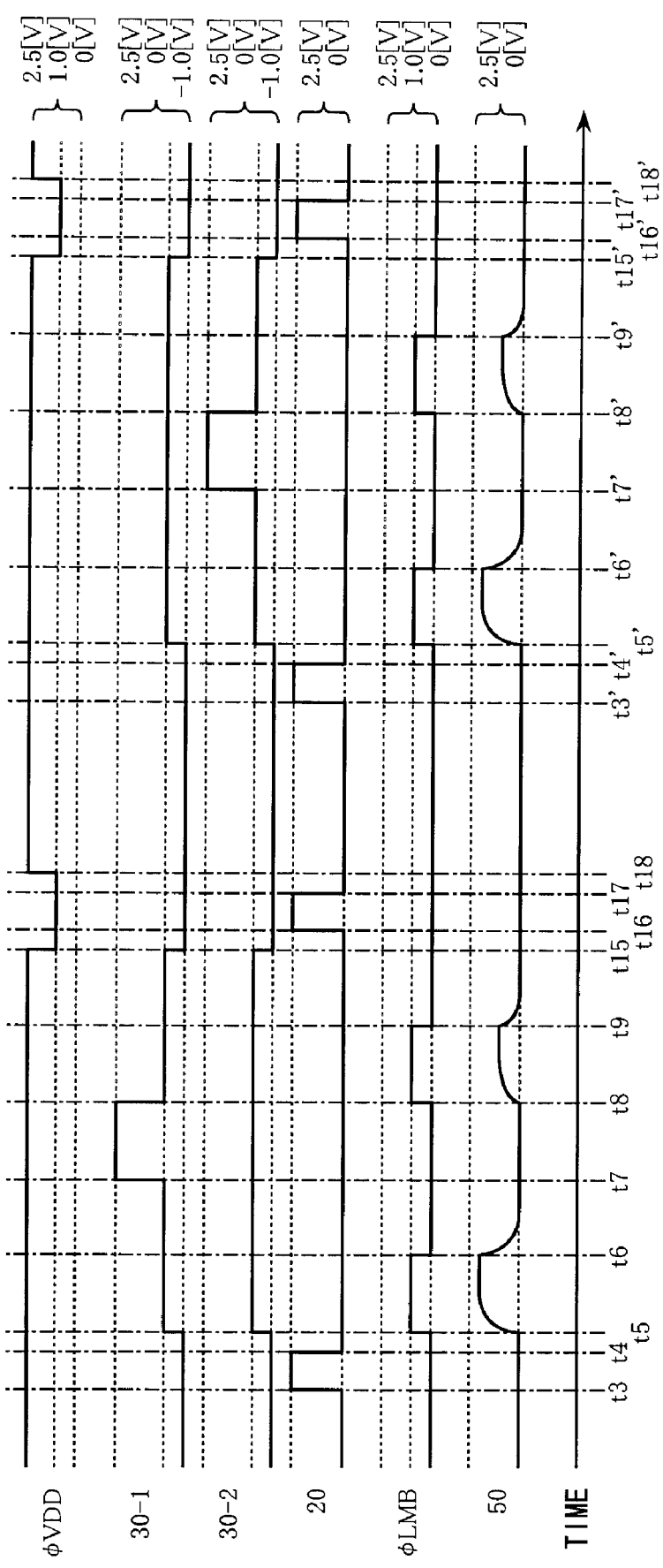
FIG. 13 is a timing chart for explaining another operation of the fourth embodiment shown in FIG. 11.

A more preferred drive operation of the fourth embodiment will now be described by way of the timing chart shown in FIG. 13. Referring to FIG. 13, the operation from time t3 to t9 is similar to the operation of the third embodiment shown in FIG. 10. It is different from the operation shown in FIG. 10 in that the voltage φVDD of the power supply line is brought to Low level (1.0V for example) between time t15 and t18, and FD reset switch line 20 to High level (time t16~t17). The charge accumulation section FD thereby becomes Low level to put unit pixel into unselected condition. Similarly to FIG. 12, while φLMB in FIG. 13 is not directly related to the invention and thus is not shown in FIG. 11, it is a clock for controlling a constant current supply connected to the vertical signal line 50. The constant current supply then is assumed to be activated when φLMB is Low level (1.0V for example) and be inactivated when φLMB is at the ground voltage GND level. The rest is similar to the operation of the third embodiment shown in FIG. 10, and advantage of suppressing dark current occurring at unit pixel is also similar.

In the fourth embodiment as described above, since select transistor M4 and select switch line 10 for constituting unit pixel can be reduced in addition to the advantage similar to the third embodiment, an increase in a pixel pitch can be controlled.

Embodiment 5

Figure 14:
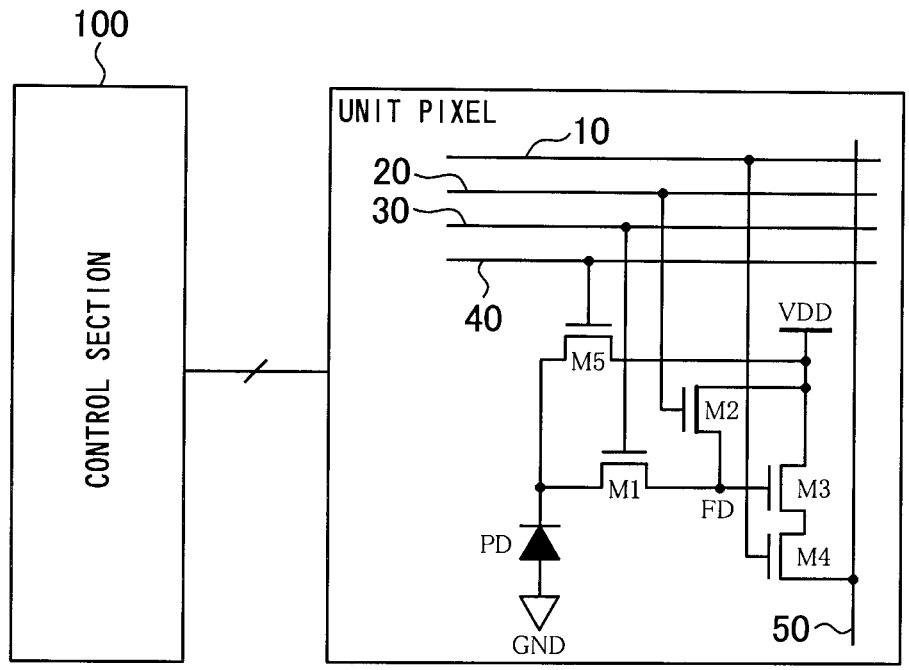
FIG. 14 schematically shows construction of the solid-state imaging apparatus according to a fifth embodiment.

A fifth embodiment will now be described. The fifth embodiment is an embodiment corresponding to the first, second, and fourth aspects of the invention. FIG. 14 schematically shows construction of the solid-state imaging apparatus according to the fifth embodiment. The construction of unit pixel of the present embodiment will now be described. The unit pixel in the fifth embodiment includes: a photodiode PD for generating signal charges corresponding to the amount of an incident electromagnetic wave; a charge accumulation section FD for accumulating electric charges generated at the photodiode PD; a transfer transistor M1 serving as a transfer switch for transferring electric charges generated at the photodiode PD to the charge accumulation section FD; a FD reset transistor M2 serving as a reset switch for resetting the charge accumulation section FD; an amplification transistor M3 for amplifying a signal corresponding to electric charges of the charge accumulation section FD; a select transistor M4 serving as a select switch for selecting the signal; and a PD reset transistor M5 serving as a reset switch for resetting the photodiode PD. The solid-state imaging apparatus is then formed with including: a select switch line 10 connected to a gate of the select transistor M4; FD reset switch line 20 connected to a gate of the FD reset transistor M2; a transfer switch line 30 connected to a gate of the transfer transistor M1; a PD reset switch line 40 connected to a gate of the PD reset transistor M5; a vertical signal line 50 connected to a source of the select transistor M4; and a control section 100 for driving/controlling these. The FD reset transistor M2 in this illustrated example is assumed to be a depletion type MOS transistor or its equivalent.

Figure 15:
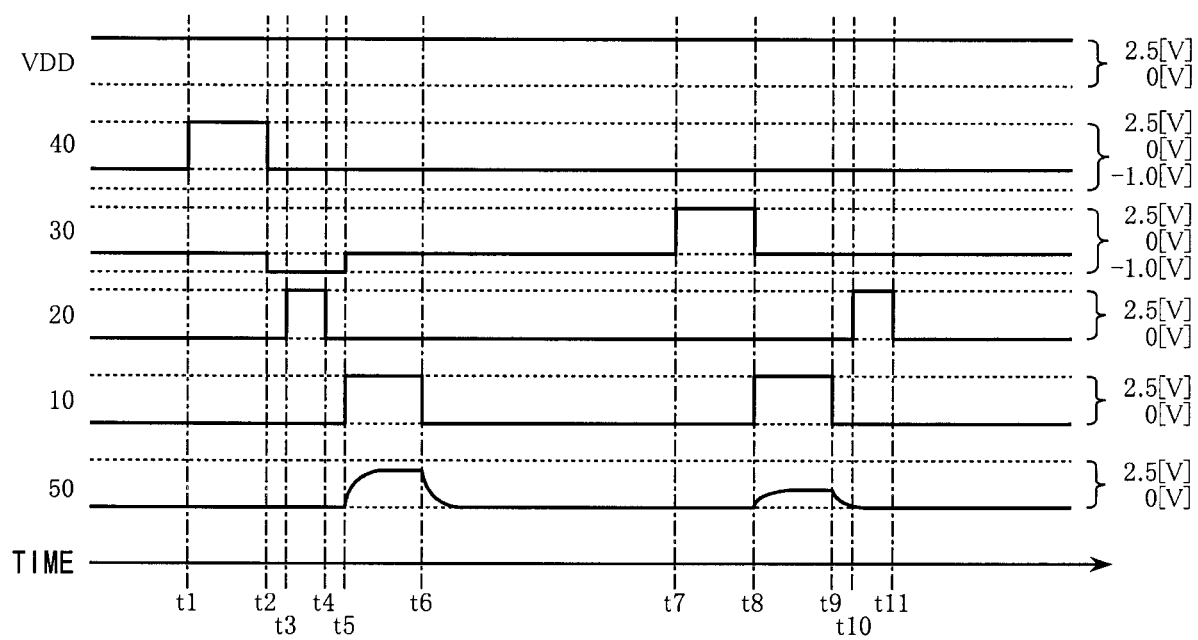
FIG. 15 is a timing chart for explaining an operation of the fifth embodiment shown in FIG. 14.

An operation of the fifth embodiment having the above construction will now be described by way of the timing chart shown in FIG. 15. At first, PD reset switch line 40 is driven to High level (time t1~t2) to discharge electric charges of photodiode PD to a power supply line VDD. The transfer switch line 30 is then brought to Minus level (time t2~t5), and FD reset switch line 20 is subsequently driven to High level (time t3~t4). The electric charge accumulation section FD is thereby reset to the power supply voltage VDD.

Next, after the resetting of the charge accumulation section FD, the transfer switch line 30 is brought to ground voltage GND, and at the same time the select switch line 10 is driven to High level (time t5~t6) so that a reset level of unit pixel is outputted to the vertical signal line 50. After passage of a desired accumulation time (time t6~t7), the transfer switch line 30 is driven to High level (time t7~t8) so that electric charges of the photodiode PD are transferred to the charge accumulation section FD. The select switch line 10 is then driven to High level again (time t8~t9) to output a signal level of unit pixel to the vertical signal line 50. Subsequently, a difference between the reset level and the signal level of unit pixel outputted from the vertical signal line 50 is taken at a signal processing circuit section (not shown) to thereby obtain a signal component. Here, High level is assumed to be the power supply voltage VDD (2.5 V in this case), and Minus level be a negative voltage (−1.0 V in this case) below the ground voltage GND (0V).

Figure 16:
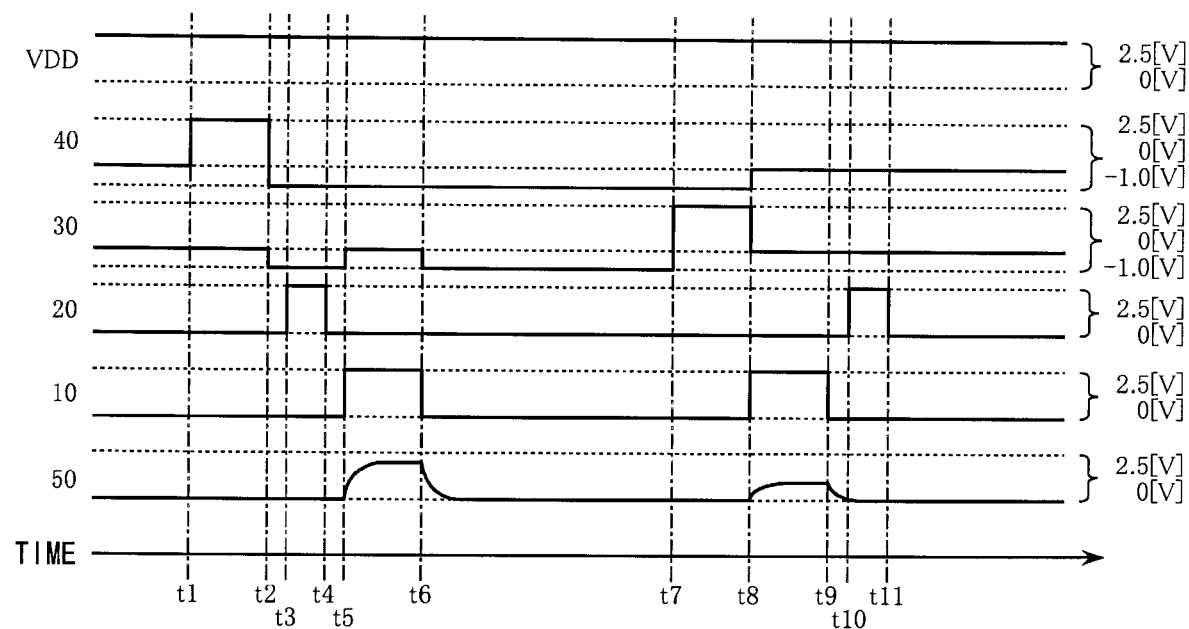
FIG. 16 is a timing chart for explaining another operation of the fifth embodiment shown in FIG. 14.

A more preferred drive operation of the fifth embodiment will now be described by way of the timing chart shown in FIG. 16. This drive operation is similar to the drive operation shown in the timing chart of FIG. 15 except that PD reset switch line 40 is put to Minus level in the period of time t2 to t8, and the transfer switch line 30 to Minus level in the period of time t6 to t7. It is thereby possible to suppress dark current occurring at the unit pixel (especially at photodiode PD).

As described above, the transfer switch line 30 is brought from Minus level to ground voltage GND after the reset of the charge accumulation section FD so that a feed-through effect of the transfer transistor M1 can be used to make the reset potential of the charge accumulation section FD more preferable as compared to the case where the level change operation of transfer switch line is absent.

Embodiment 6

Figure 17:
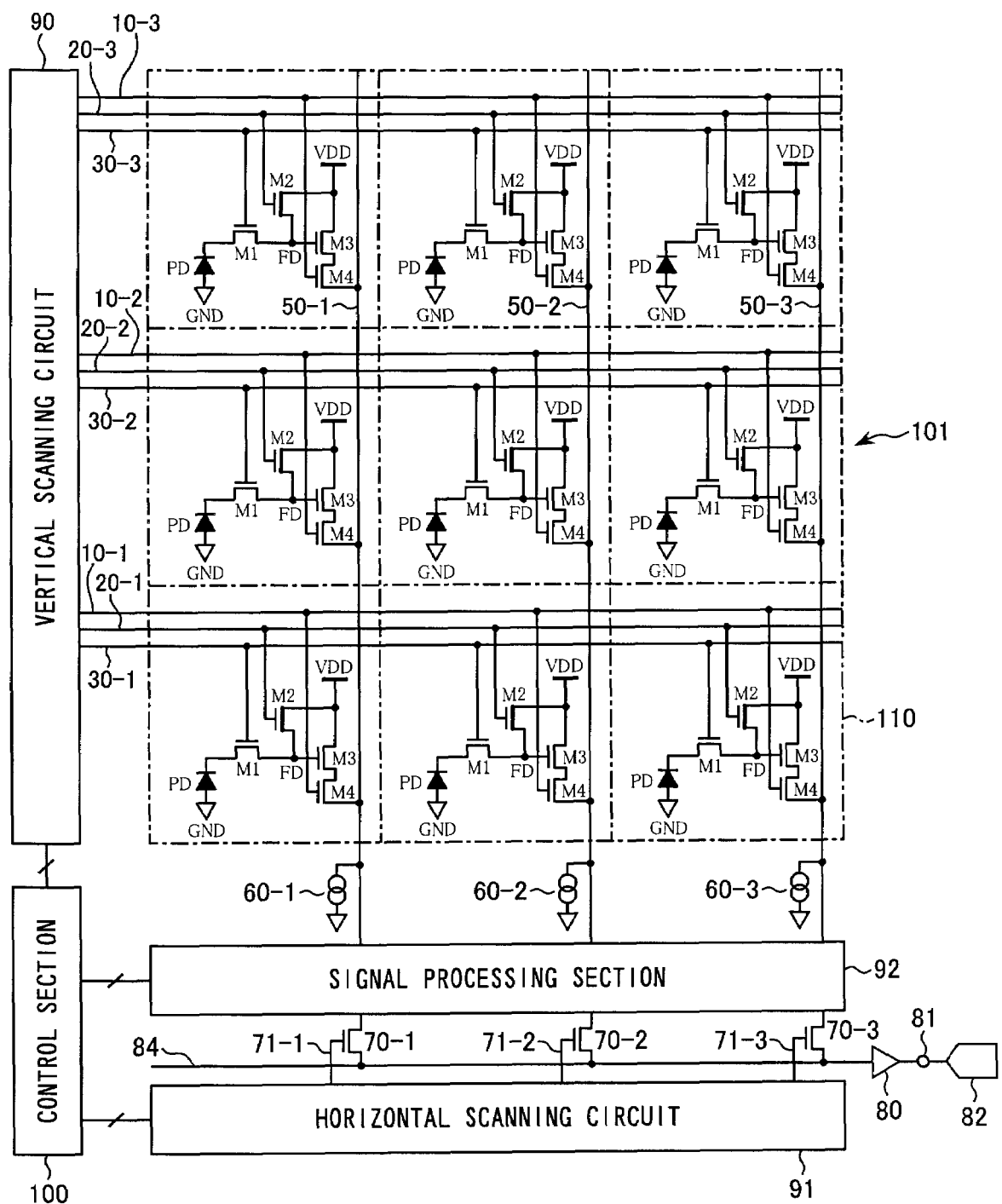
FIG. 17 is a circuit diagram showing partially in blocks construction of the solid-state imaging apparatus according to a sixth embodiment.

A sixth embodiment will now be described. The sixth embodiment is an embodiment corresponding to the first, second, and fourth aspects of the invention. FIG. 17 is a circuit diagram showing partially in blocks construction of a more concrete example of solid-state imaging apparatus according to the sixth embodiment. Referring to FIG. 17, denoted by numeral 101 is a pixel section shown as having construction where unit pixels 110 as shown in FIG. 1 are, for ease of explanation, arranged into three rows by three columns. It includes: 10-1, 10-2, 10-3, select switch line connected in common to the unit pixels of each row; 20-1, 20-2, 20-3, FD reset switch line of each row; 30-1, 30-2, 30-3, transfer switch line of each row; 50-1, 50-2, 50-3, vertical signal line connected in common to the unit pixels of each column; 60-1, 60-2, 60-3, constant current supply connected to the respective vertical signal lines 50-1, 50-2, 50-3; 92, a signal processing section for processing pixel signals outputted to the vertical signal lines 50-1, 50-2, 50-3; 70-1, 70-2, 70-3, common signal output transfer transistor serving as a common signal output transfer switch for sequentially outputting to a common signal line 84 the output signals subjected to signal processing at the signal processing section 92; 71-1, 71-2, 71-3, common signal output transfer switch line for applying a horizontal scanning signal from a horizontal scanning circuit section 91 to the common signal output transfer transistors 70-1, 70-2, 70-3; 80, an output amplifier connected to the common signal output line 84; 82, A/D converter; 90, a vertical scanning circuit for outputting control signal to the select switch lines 10-1, 10-2, 10-3, FD reset switch lines 20-1, 20-2, 20-3, and transfer switch lines 30-1, 30-2, 30-3; and 100, a control section for controlling each section.

Figure 18:
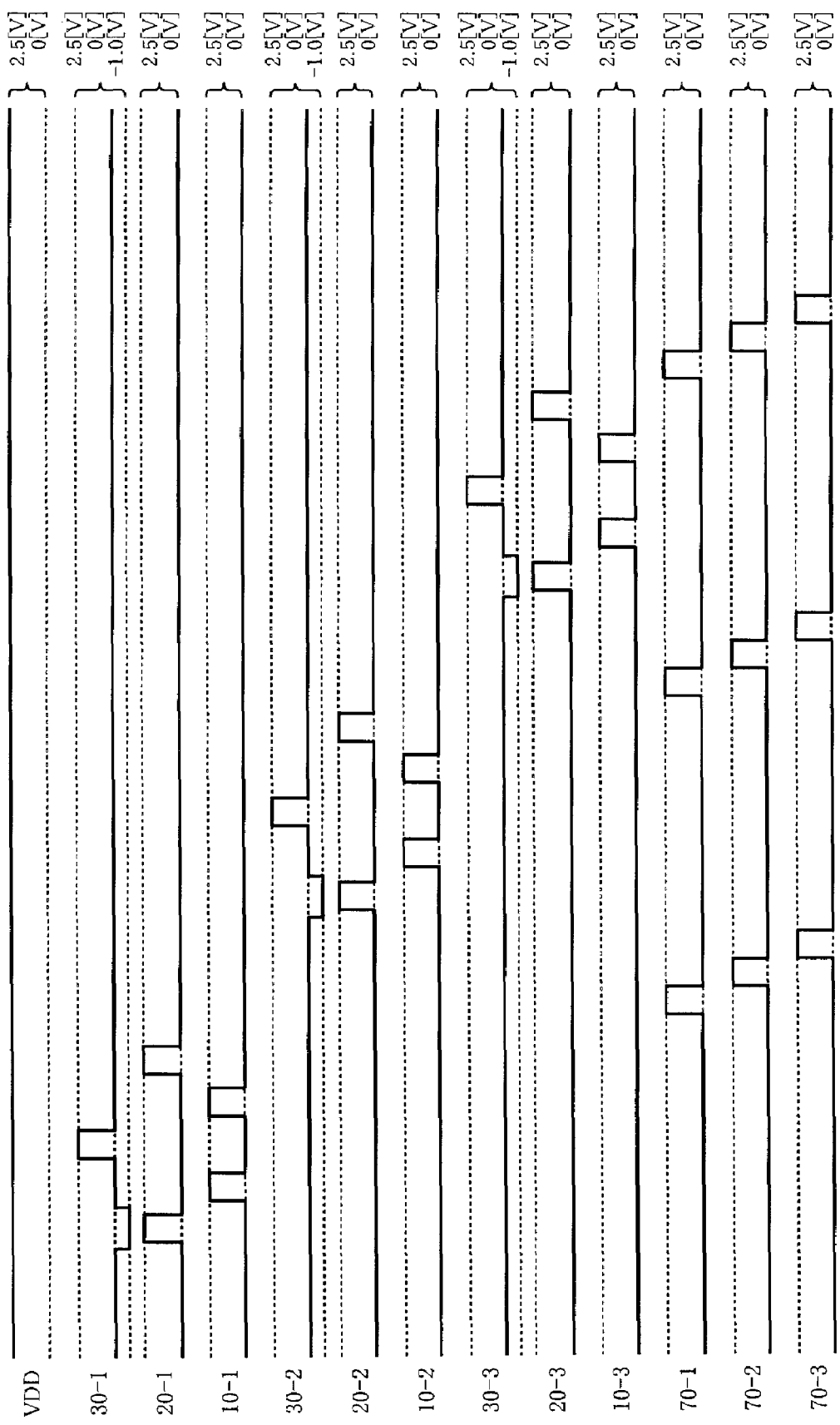
FIG. 18 is a timing chart for explaining an operation of the sixth embodiment shown in FIG. 17.

An operation of the sixth embodiment having the above construction will now be described by way of the timing chart shown in FIG. 18. At first, the transfer switch line 30-1 is brought to Minus level, and FD reset switch line 20-1 is then driven to High level. The charge accumulation section FD of all unit pixels of the first row is thereby reset to a power supply voltage VDD. Next, after the transfer switch line 30-1 is brought to ground voltage GND, the select switch line 10-1 is driven to High level so that reset levels of the unit pixels of the first row are outputted to the signal processing circuit section 92 through the vertical signal lines 50-1, 50-2, 50-3.

Next, the transfer switch line 30-1 is driven to High level to transfer signal charges of photodiode PD to the charge accumulation section FD. The select switch line 10-1 is then driven to High level again to output signal level of the unit pixel through the vertical signal lines 50-1, 50-2, 50-3 to the signal processing circuit section 92. Only the signal component is then extracted by removing the reset level from the signal level at the signal processing circuit section 92.

Next, the reset switch line 20-1 is driven to High level to reset the charge accumulation section FD of all unit pixels of the first row to power supply voltage VDD. Subsequently, the common signal output transfer switch lines 71-1 to 71-3 connected to the common signal output transfer transistors 70-1, 70-2, 70-3 are sequentially driven to High level so that the signal components are sequentially outputted to an output terminal 81 through the common signal output line 84 and amplifier 80. Such output is then subjected to analog-to-digital conversion by AD converter 82. The signal processing circuit section 92 is controlled/driven by the control section 100, and the common signal output transfer switch lines 71-1, 71-2, 71-3 are driven by horizontal scanning signal from the horizontal scanning circuit 91 which is controlled in accordance with drive control of the control section 100. The signals from the unit pixels of the second row and after are also similarly read out as shown in FIG. 18. Here, High level is assumed to be the power supply voltage VDD (2.5 V in this case), and Minus level be a negative voltage (−1.0 V in this case) below the ground voltage GND (0V).

As described above, by bringing the transfer switch lines 30-1, 30-2, 30-3, from Minus level to ground voltage GND after reset of the charge accumulation section FD, the feed-through effect of the transfer transistor M1 can be used to make the reset potential of the charge accumulation section FD more preferable as compared to the case where the level change operation of transfer switch line is absent. A low voltage drive or a wide dynamic range drive in the case where the power supply voltage is unchanged thereby becomes possible. It should be noted that arrangement/construction of the pixel section of the present embodiment has been described by way of but is not limited to a pixel section where unit pixels are simply arranged into three rows by three columns with using the unit pixel shown in the first embodiment of FIG. 1.

Embodiment 7

Figure 19:
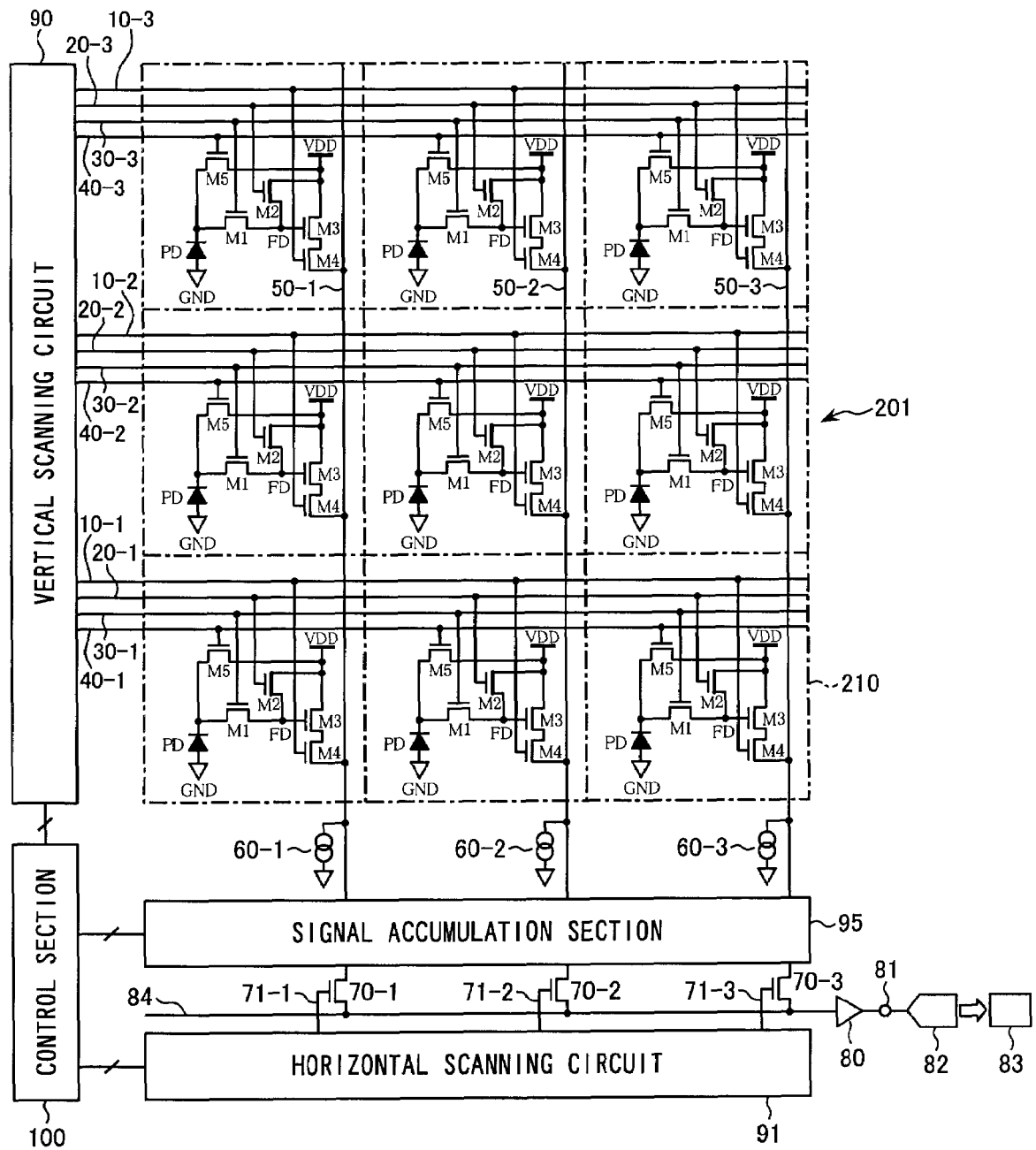
FIG. 19 is a circuit diagram showing partially in blocks construction of the solid-state imaging apparatus according to a seventh embodiment.

A seventh embodiment will now be described. The seventh embodiment is an embodiment corresponding to the first, second, and fourth aspects of the invention. FIG. 19 is a circuit diagram showing partially in blocks construction of a more concrete example of solid-state imaging apparatus according to the seventh embodiment. As shown in FIG. 19, the solid-state imaging apparatus according to the seventh embodiment includes: a pixel section 201 consisting of a 3-row by 3-column arrangement of unit pixels 210 of the fifth embodiment shown in FIG. 14; select switch lines 10-1, 10-2, 10-3; FD reset switch lines 20-1, 20-2, 20-3; transfer switch lines 30-1, 30-2, 30-3; PD reset switch lines 40-1, 40-2, 40-3; vertical signal lines 50-1, 50-2, 50-3; constant current supply 60-1, 60-2, 60-3; common signal output transfer transistors 70-1, 70-2, 70-3 serving as a common signal output transfer switch; common signal output transfer switch lines 71-1, 71-2, 71-3; an output amplifier 80; AD converter 82; a frame memory 83; a common signal output line 84; a vertical scanning circuit 90; a horizontal scanning circuit 91; a signal accumulation section 95; and a control section 100 for controlling these.

Figure 20:
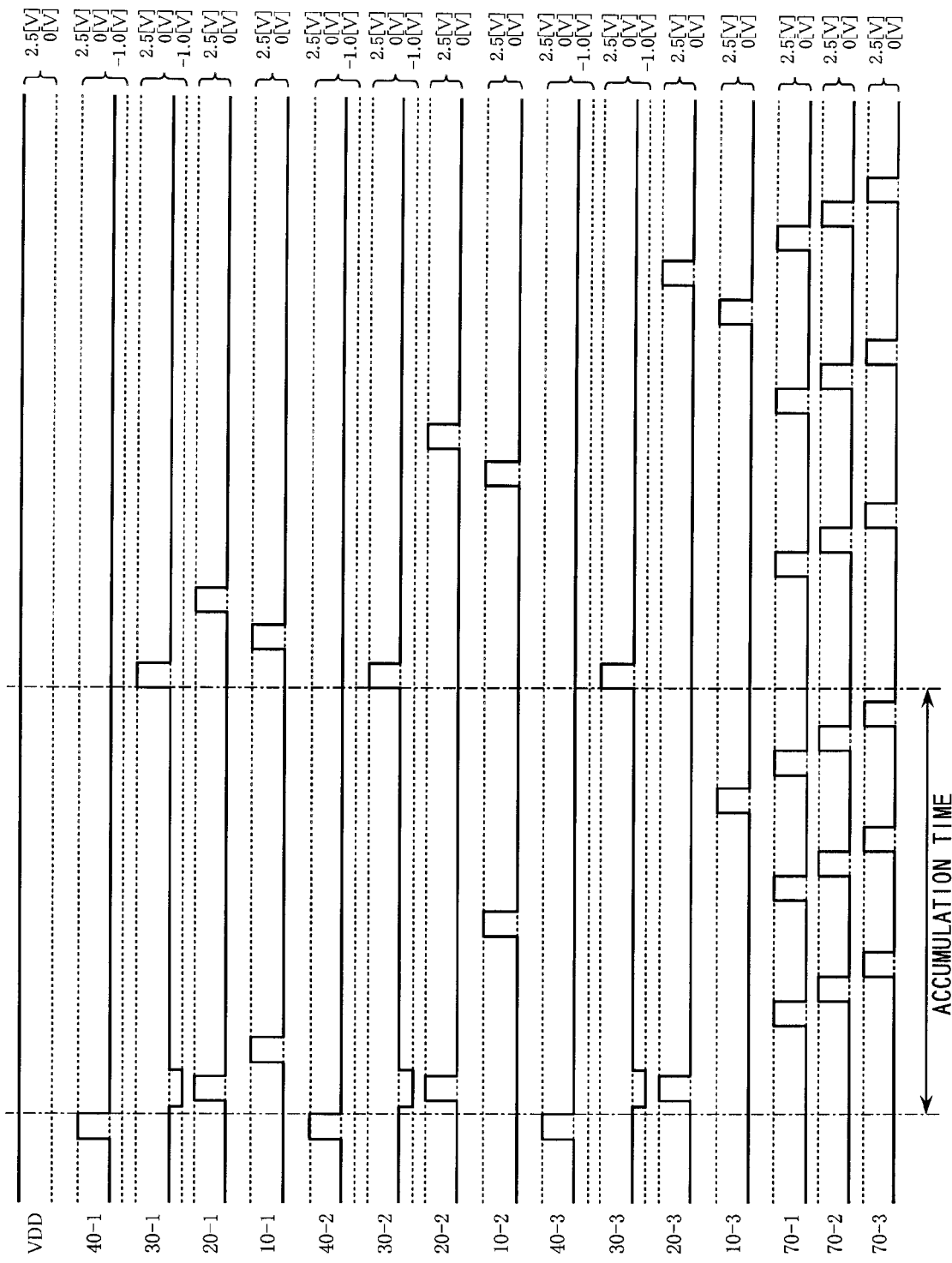
FIG. 20 is a timing chart for explaining an operation of the seventh embodiment shown in FIG. 19.

An operation of the seventh embodiment having the above construction will now be described by way of the timing chart shown in FIG. 20. At first, PD reset switch lines 40-1 to 40-3 are driven to High level. The electric charges of photodiode PD of all unit pixels are thereby discharged to the power supply line VDD. Next, the transfer switch lines 30-1 to 30-3 are brought to Minus level, and FD reset switch lines 20-1 to 20-3 are then driven to High level. The charge accumulation section FD of all unit pixels is thereby reset to the power supply voltage VDD.

Next, after bringing the transfer switch lines 30-1 to 30-3 to ground voltage GND, the select switch line 10-1 is driven to High level to thereby retain reset levels of the unit pixels of the first row at the signal accumulation section 95. Subsequently, the common signal output transfer switch lines 71-1 to 71-3 connected to the common signal output transfer transistors 70-1, 70-2, 70-3 are sequentially driven to High level so that reset levels retained at the charge accumulation section 95 are sequentially outputted to the output terminal 81 through the common signal output line 84 and amplifier 80. Such output is subjected to analog-to-digital conversion by AD converter 82, and is retained at the frame memory 83. The accumulation operation to the signal accumulation section 95 is controlled/driven by the control section 100, and the common signal output transfer switch lines 71-1 to 71-3 are driven by horizontal scanning signal from the horizontal scanning circuit 91 in accordance with drive control of the control section 100. The second row and after are also similarly read out as shown in FIG. 20, and reset levels corresponding to all unit pixels are retained at the frame memory 83.

By driving the transfer switch lines 30-1 to 30-3 to High level after passage of a desired accumulation time, the electric charges of photodiode PD of all unit pixels are transferred to the charge accumulation section FD. Next, the select switch line 10-1 of the first row is driven to High level to retain signal levels of the unit pixels of the first row at the charge accumulation section 95. Next, FD reset switch line 20-1 is driven to High level to reset the charge accumulation section FD. Subsequently, the common signal output transfer switch lines 71-1 to 71-3 connected to the common signal output transfer transistors 70-1, 70-2, 70-3 are sequentially driven to High level so that signal levels retained at the signal accumulation section 95 are sequentially outputted to the output terminal 81 through the common signal output line 84 and amplifier 80. The output is then subjected to analog-to-digital conversion by AD converter 82, and its difference from the reset levels of the first row previously retained at the frame memory 83 is taken. Only the signal components removed of a reset noise and a fixed pattern noise are thereby extracted. The second row and after are also similarly read out as shown in FIG. 20 so that signal components having high S/N are obtained. Here, High level is assumed to be the power supply voltage VDD (2.5 V in this case), and Minus level be a negative voltage (−1.0 V in this case) below the ground voltage GND (0V).

As described above, by bringing the transfer switch lines 30-1 to 30-3 from Minus level to ground voltage GND after reset of the charge accumulation section FD, the feed-through effect of the transfer transistor M1 can be used to make the reset potential of the charge accumulation section FD more preferable as compared to the case where the level change operation of transfer switch line is absent. A low voltage drive or a wide dynamic range drive in the case where the power supply voltage is unchanged thereby becomes possible. It should be noted that arrangement/construction of the pixel section of the present embodiment has been described by way of but is not limited to a pixel section where unit pixels are simply constructed into three rows by three columns with using the unit pixel of the fifth embodiment shown in FIG. 14 in the case of determining the timings of start and end of signal accumulation of all rows as the same.

According to the invention as has been described by way of the above embodiments, it is possible to provide a solid-state imaging apparatus with securing a saturation electron number and a power supply voltage required for the goods, and in addition the solid-state imaging apparatus capable of generating image signals having high S/N. Especially with the first and second aspects of the invention, it becomes possible to use the feed-through effect of the signal transfer means so that a low voltage drive or a wide dynamic range drive when the power supply voltage is unchanged becomes possible. With the third aspect of the invention, the feed-through effect of the signal transfer means within each subunit can be used so that a drive at even lower voltage or a drive having even wider dynamic range when the power supply voltage is unchanged becomes possible. With the fourth aspect of the invention, it is unnecessary to separately provide an intermediate potential between the negative potential and the power supply voltage.

What is claimed is:

1. A solid-state imaging apparatus comprising:
    an image section with units arranged into a matrix each comprising an electric charge generation means for generating signal charges corresponding to the amount of an incident electromagnetic wave, an electric charge accumulation means for accumulating signal charges generated at the electric charge generation means, a signal transfer means for transferring signal charges generated at said electric charge generation means to said electric charge accumulation means, a reset means for resetting said electric charge accumulation means, an amplification means for amplifying a signal corresponding to signal charges accumulated at said electric charge accumulation means, and a selection means for activating an outputting to a signal output line of the signal amplified by the amplification means; and
    a control section for, when resetting said electric charge accumulation means, effecting control so as to bring a potential of a control terminal of said transfer means to a negative potential at least immediately before a reset operation by said reset means and to bring the potential of the control terminal of said transfer means to a potential higher than said negative potential after the reset operation.

2. The solid-state imaging apparatus according to claim 1, wherein said control section effects control so that a reset potential of said electric charge accumulation means is outputted to said signal output line after bringing the potential of the control terminal of said transfer means to a potential higher than negative potential.

3. The solid-state imaging apparatus according to claim 1, wherein a subunit consisting of said electric charge generation means and said signal transfer means is formed, and a plurality of said subunit are connected in common to said electric charge accumulation means.

4. The solid-state imaging apparatus according to claim 2, wherein, forming as a subunit said electric charge generation means and said signal transfer means, a plurality of said subunit are connected in common to said electric charge accumulation means.

5. The solid-state imaging apparatus according to claim 1, wherein said control section sets a potential higher than said negative potential as ground potential.

6. The solid-state imaging apparatus according to claim 2, wherein said control section sets a potential higher than said negative potential as ground potential.

7. The solid-state imaging apparatus according to claim 3, wherein said control section sets a potential higher than said negative potential as ground potential.

8. The solid-state imaging apparatus according to claim 4, wherein said control section sets a potential higher than said negative potential as ground potential.

* * * * *